United States Patent
Kelly

(10) Patent No.: US 8,939,065 B2
(45) Date of Patent: Jan. 27, 2015

(54) BREW CHAMBER PACKET EJECTOR

(75) Inventor: Luke Kelly, Bonner Springs, KS (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

(21) Appl. No.: 13/424,624

(22) Filed: Mar. 20, 2012

(65) Prior Publication Data

US 2012/0240785 A1  Sep. 27, 2012

Related U.S. Application Data

(60) Provisional application No. 61/467,938, filed on Mar. 25, 2011.

(51) Int. Cl.
  *A47J 31/00* (2006.01)
  *A47J 31/06* (2006.01)

(52) U.S. Cl.
  CPC .................... *A47J 31/0678* (2013.01)
  USPC .......................................................... 99/323

(58) Field of Classification Search
  USPC ......... 99/323, 285–295, 289 R, 302 R, 302 P, 99/318, 312, 279; 222/63
  See application file for complete search history.

(56) References Cited

U.S. PATENT DOCUMENTS

| | | | |
|---|---|---|---|
| 4,667,587 A * | 5/1987 | Wunder | 99/295 |
| 5,392,694 A * | 2/1995 | Muller et al. | 99/295 |
| 6,079,315 A | 6/2000 | Beaulieu et al. | |
| 6,182,554 B1 * | 2/2001 | Beaulieu et al. | 99/289 R |
| 6,279,315 B1 * | 8/2001 | Harju | 60/410 |
| 6,857,353 B2 | 2/2005 | Kollep et al. | |
| 7,210,401 B1 * | 5/2007 | Rolfes et al. | 99/289 R |
| 7,690,530 B2 * | 4/2010 | Schneider et al. | 222/63 |
| 8,250,970 B2 * | 8/2012 | Thomas | 99/289 R |
| 2007/0221069 A1 * | 9/2007 | Rahn et al. | 99/323 |

FOREIGN PATENT DOCUMENTS

| | | |
|---|---|---|
| EP | 102125 A2 | 3/1984 |
| FR | 2886121 A1 | 12/2006 |

OTHER PUBLICATIONS

International Search Report, Jun. 20, 2012, 2 pages.

* cited by examiner

*Primary Examiner* — Dana Ross
*Assistant Examiner* — Renee L Miller
(74) *Attorney, Agent, or Firm* — Fulwider Patton LLP

(57) ABSTRACT

A brew basket for a brewing apparatus is disclosed having a housing adapted to couple the brew basket to a brewing apparatus and a platform extending from the housing, the platform including a brewing chamber defined by a continuous peripheral wall and a perforated floor. The perforated floor is coupled to a vertically reciprocating member at a first end for raising and lowering the perforated floor of the brew basket with respect to the continuous peripheral wall, the vertically reciprocating member extending below a lowermost surface of the platform so that it can be raised by lowering the platform onto a flat surface.

5 Claims, 3 Drawing Sheets

BREW CHAMBER PACKET EJECTOR

CROSS-REFERENCES TO RELATED APPLICATIONS

This application claims priority from U.S. Provisional Application No. 61/467,938, filed Mar. 25, 2011, incorporated by reference in its entirety.

BACKGROUND

The present invention relates generally to beverage brewing equipment, and more particularly to a brewing compartment with an ejector system to quickly eject a packet of brewing material such as coffee or espresso grounds, or tea leaves, without tearing the packet of material or shaking the chamber.

When brewing certain beverages such as espresso or coffee, prepackaged packets of ground beans are used in lieu of loose grounds. This is true particularly in the food service industry to ensure consistency between brew cycles and to shorten the time necessary to initiate a brew cycle. Pre-packaged packets of ground espresso or coffee are placed into the coffee brewer's brew basket, eliminating the need to measure the grounds and reducing the amount of debris or mess in the operation. The pre-filled packets are made of a filter-like material that allows infusion of water into the packet and release of the oils flavors that are emitted from the grounds when they are exposed to boiling or near boiling water.

In the case of espresso, the brew chamber is also subjected to high pressures of up to 160 to 180 psi in addition to temperatures around two hundred degrees Fahrenheit. This environment of high pressure and high temperature has been found to yield the most flavorful beverage, but can also tend to cause the expended packet of grounds to adhere to the inside of the brew chamber after the brewing operation is completed. Where the adherence is particularly high, an operator must extract the spend brew packet either manually or using some nearby utensil such as a fork or the like, or by shaking and banging the brew chamber on a nearby surface. In the former case, using one's hand to remove the potentially scalding packet post brewing can lead to burns or at least discomfort to the operator. Using a utensil or other device in an attempt to extract the packet of used grounds can often puncture or tear the packet, leading to a situation where grounds spill into the brewing chamber and create a mess. Finally, banging or shaking the chamber can damage the chamber and lead to premature replacement of the brewing chamber, not to mention the safety hazard to the operator and any nearby co-workers or patrons.

SUMMARY OF THE INVENTION

The present invention seeks to overcome the drawbacks discussed above by providing a brewing chamber with an ejector mechanism that can eject a spent packet of brewing material after a brewing operation without reaching into the brew chamber to extract the spent packet and without using a separate utensil or other device that may tear or puncture the packet. The brewing chamber of the present invention may include a mesh screen that forms the bottom panel of the brewing chamber, where the brewing packet is seated during the brewing operation and the mesh screen allows the brewed beverage to pass through the screen to a collection reservoir below. Once the brewing operation is complete, the mesh screen can be elevated by depressing an ejector pin that is physically connected to the mesh screen. The ejector pin can be depressed either digitally, or by lowering the brewing basket or chamber onto any flat surface. As the ejector pin is depressed, the mesh screen raises up and lifts the spent brew packet with it, breaking any residual surface tension that may have formed between the wetted brewing packet and the similarly wetted inner surfaces of the chamber walls. Once the spent packet is separated from the chamber walls, it can more readily be discarded since the adherence with the chamber walls is removed by the act of raising the "floor" of the chamber with the ejector pin. Thus, there is no need for touching the brewing packet manually or with a utensil, and there is no need to shake or bang the chamber in an attempt to extract the spent packet from the bottom of the chamber.

DETAILED DESCRIPTION OF THE PREFERRED EMBODIMENTS

Figure 1:
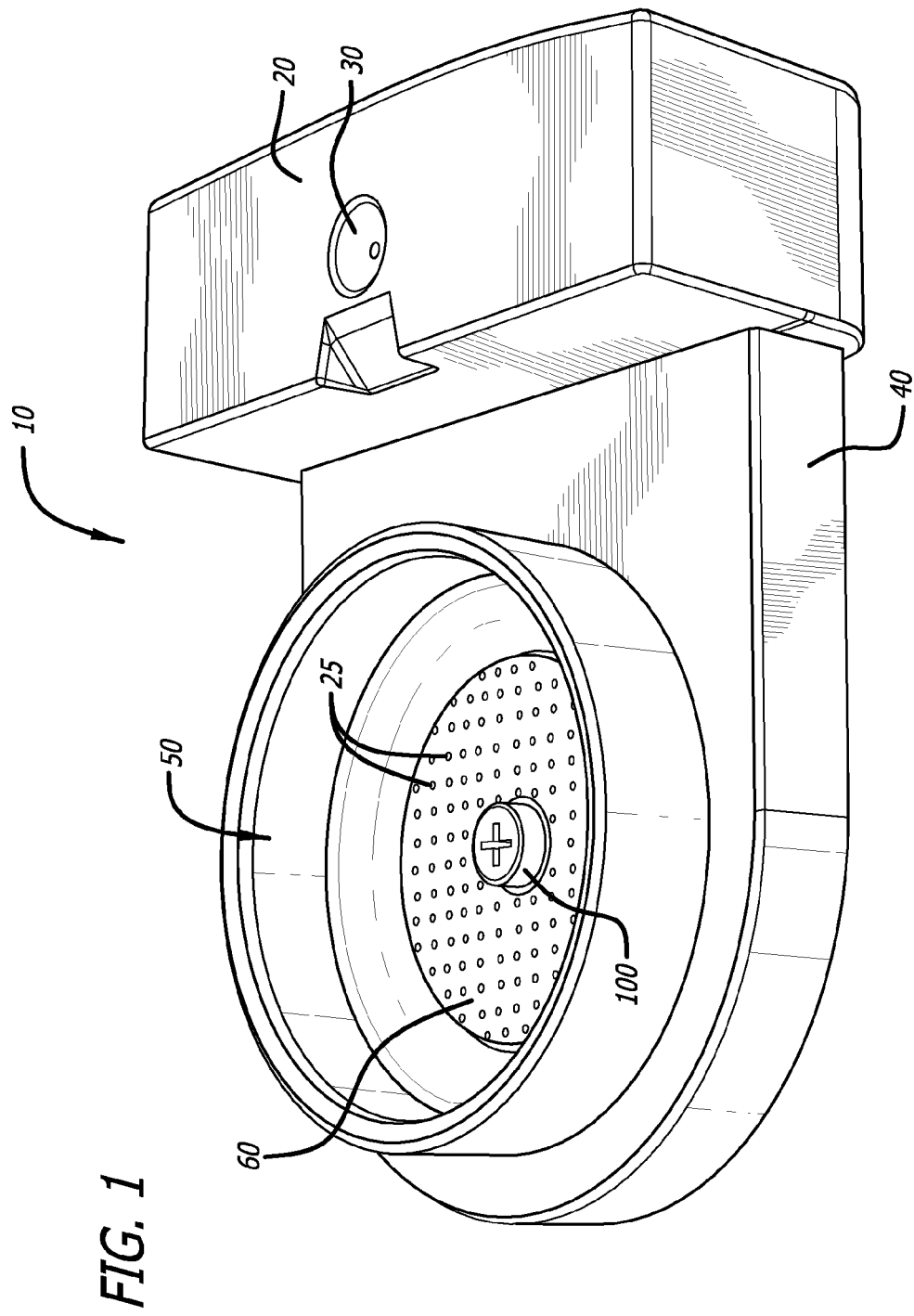
FIG. 1 is an elevated, perspective view of the brewing chamber of the present invention.
Figure 2:
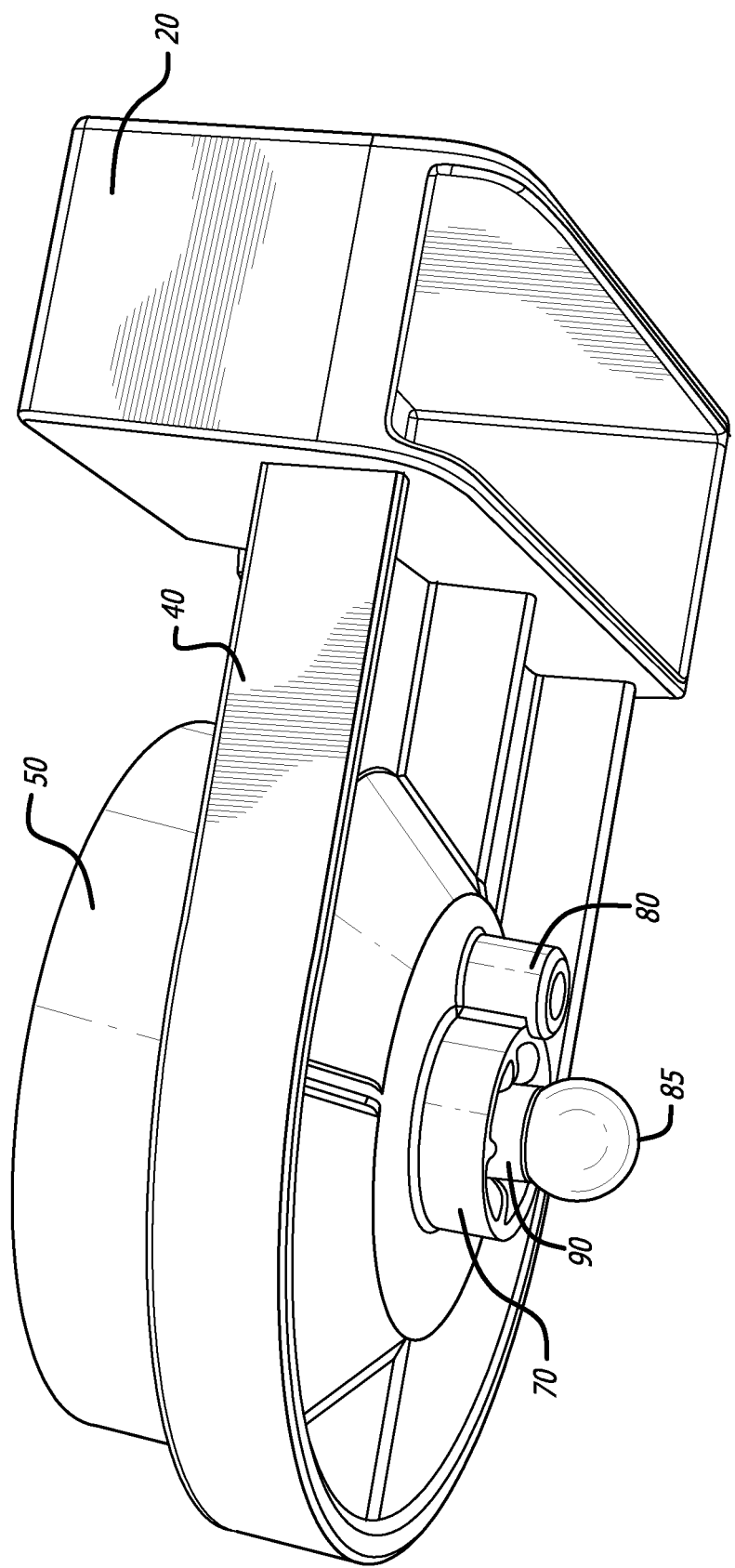
FIG. 2 is a perspective view of the brewing chamber of FIG. 1 from below.

FIG. 1 illustrates a brew basket 10 the present invention, including a housing 20 that connects into a brewing apparatus (not shown) and plugs into the brewing apparatus like a socket arrangement. The housing 20 may have a recess 30 that cooperates with a detent (not shown) on the brewing apparatus to releasably secure the housing 20 into the apparatus. The housing 20 includes a platform 40 that extends substantially horizontally, into which a bowl-shaped brewing chamber 50 may be formed. The chamber 50 forms an enclosure which, when the housing is mounted in the brewing apparatus, serves to accommodate the near boiling water under high pressure that is introduced for the purpose of extracting the oils and flavors from ground espresso or coffee beans (not shown) disposed in the chamber 50. The bottom floor of the chamber 50 is a mesh panel or screen 60 with a plurality of perforations 25 that permit fluid to pass through but do not allow espresso grounds or other solids from passing. A packet of espresso grounds is placed into the chamber 50 prior to beginning the brew cycle of the apparatus. When heated water is introduced into the chamber 50, it contacts and immerses the packet and its enclosed grounds until the grounds are completely wetted. As the grounds soak in the heated water, they emit the trapped flavors and oils of the ground beans, and the water infused with flavors from the extracted oils then flows down through the mesh panel or screen 60 via the apertures 25 and into a collection area 55 below the mesh screen 60, and then through a channel 80 (see FIG. 2) into a collection reservoir (not shown) where it can then be collected and then served.

Figure 3:
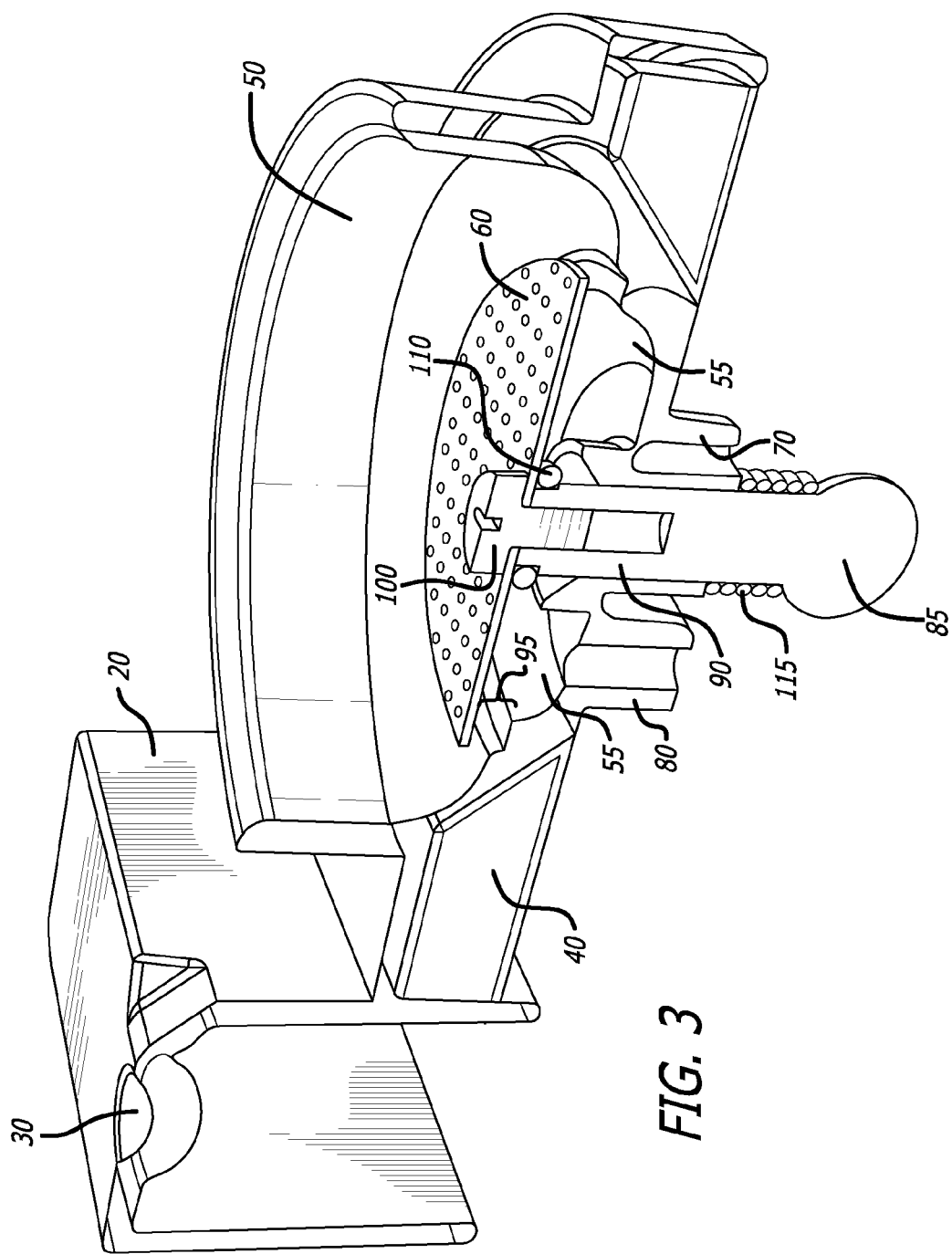
FIG. 3 is an enlarged, cross sectional view of the brew chamber with the mesh screen raised and the ejector pin depressed.

In FIG. 3, a cross section of the chamber 50 illustrates an ejector pin 90 that connects the mesh screen 60 with a bulbous pin end 85 protruding through a cylindrical enclosure 70. The enclosure 70 extends to the lowermost portion of the brewing chamber below the platform 40, so that the pin end 85 is suspended below a lowermost plane of the platform 40. The ejector pin 90 includes a collar 110 that is in contact with the screen 60, and affixed to the screen 60 with a fastener 100 disposed in the pin 90 and passing through the screen 60. Movement of the pin 90 in a vertical direction within the enclosure 70 pushes up on the collar 110, which in turn leads to a corresponding movement of the screen 60 in the vertical direction. As can be seen, in FIG. 1 the screen 60 is flush with the bottom of the chamber 50, whereas in FIG. 3 the screen 60 is elevated as a result of the pin 90 being depressed, thereby forming a gap 95, between the screen 60 and the bottom of the chamber 50. It can readily be seen that if a packet of grounds were adhered to the inside of the brewing chamber as a result of the surface tension of the adjoining wetted surfaces, the heat from the brewing operation, and the elevated pressure of the brewing operation, the raising of the mesh screen 60 would serve to detach the packet from the brewing basket wall and eliminate much if not all of the surface tension with the spent packet of grounds. In one embodiment, the pin mechanism can further include a spring member 115 to bias the mesh screen 60 in the lowered position, whereupon the ejection action would require that the force of the spring 115 be overcome to lift the mesh screen 60. Alternatively, the weight of the wet packet of grounds may be sufficient to bias the screen in the lowered position without the need for a spring.

To use the brewing basket 10 of the present invention, the housing 20 would be inserted into a brewing apparatus and a packet of pre-packaged espresso grounds or coffee grounds would be placed inside the bowl-shaped chamber on the mesh screen 60. The operator would initiate the brewing operation, which would infuse the packet of grounds with hot, pressurized water for a predetermined period. The water would enter and saturate the packet, causing the contents to release the desired flavors and oils into the water. The water, now infused with the flavor of the coffee beans, passes through the orifices 25 of the mesh screen 60 and into the collection area 55 below, and then through the channel 80 to a decanter, pitcher, or other serving vessel below the brewing station.

When the water has completely infused the grounds and the brewing operation ceases, the operator can release and remove the entire brew basket 10 from the brewing apparatus so that the spent brew packet can be extracted. Grasping the brewing basket 10 by the housing 20, the chamber 50 is lowered onto a flat horizontal or vertical surface until contact is achieved between the end 85 of the ejector pin 90 and the flat surface. Applying further pressure against the surface will cause the ejector pin 90 to move vertically upward, and causing the mesh screen 60 to be driven upward and away from the bottom of the chamber 50 as a gap 95 is formed between the chamber side walls and the mesh screen 60. Any residual surface tension that had been formed during the brewing operation, either by the pressure of the brewing operation or the wet packet's natural tendency to adhere to surrounding surfaces, would be disrupted as the packet is physically displaced from the side wall. This frees the spent packet from its attachment with the surface of the chamber, allowing the packet to be simply dumped into a trash without tearing the packet or using a utensil to pry the packet away from the chamber 50. In this manner, the operator is relieved of the trouble of cleaning up a torn or punctured packet of grounds as well as relieved of having to fish the spent packet of grounds out of the chamber with his or her fingers, and possibly suffering burns or discomfort in the process.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A brew basket comprising:
    a housing adapted to couple the brew basket to a brewing apparatus;
    a platform extending from the housing, the platform including a brewing chamber defined by a continuous peripheral wall and a perforated floor;
    a vertically reciprocating member secured at a first end to the perforated floor for raising and lowering the perforated floor with respect to the continuous peripheral wall, the vertically reciprocating member extending below a lowermost surface of the platform;
    a fastener that cooperates with the reciprocating member to capture the perforated floor of the brew basket therebetween; and
    a spring member mounted on the reciprocating member and applying a resilient force the reciprocating member to bias the perforated floor in its lowermost position.

2. The brew basket of claim 1, further comprising a cylindrical collar below the perforated floor and retained at an upper surface of the reciprocating member, whereupon the perforated floor is captured between the cylindrical collar and the fastener and reciprocates with the reciprocating member.

3. The brew basket of claim 1 wherein the reciprocating member is a cylindrical pin with a second end that has a diameter larger than a middle portion of the cylindrical pin.

4. The brew basket of claim 3 wherein the second end is bulbous.

5. The brew basket of claim 1 further comprising a liquid collection area within the brew basket below the perforated floor.

* * * * *